June 12, 1962  T. B. LUDLOW  3,038,982
TAPE HEATER
Filed Jan. 23, 1959  2 Sheets-Sheet 1
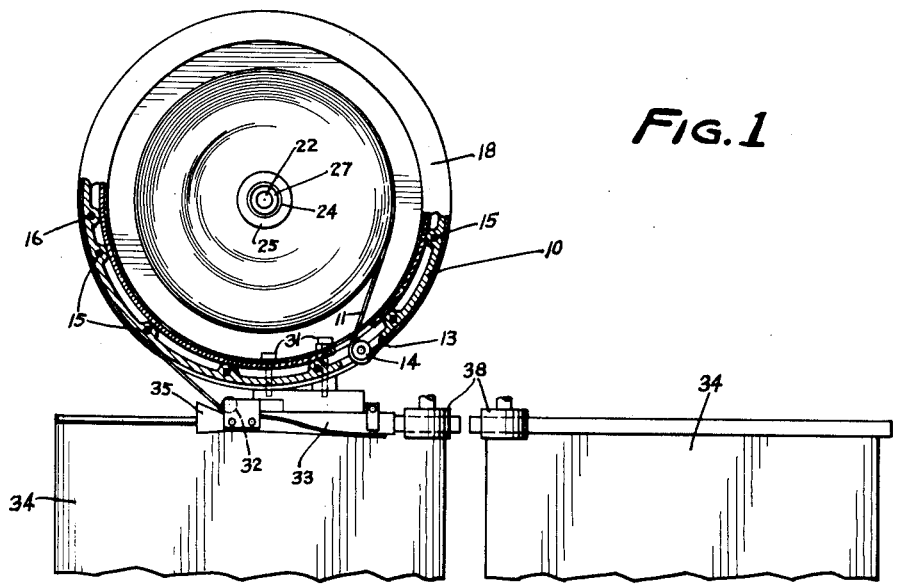
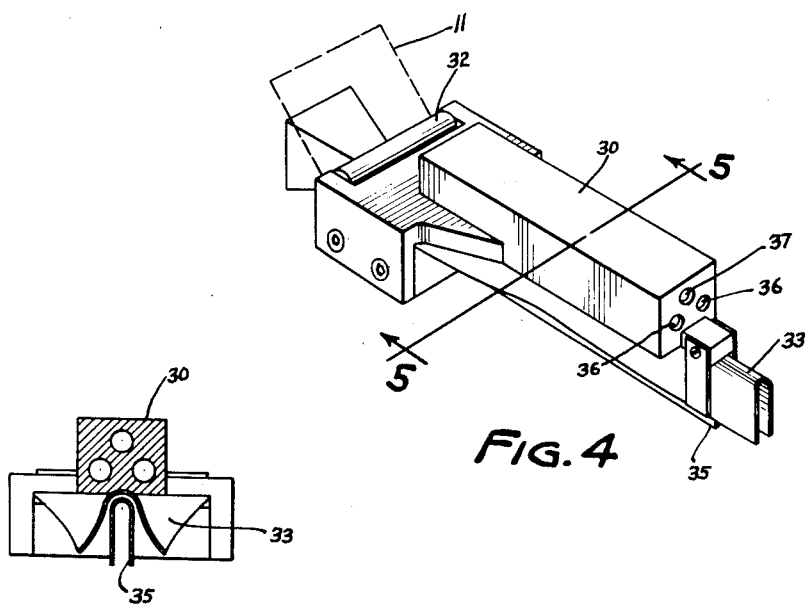
INVENTOR.
THOMAS B. LUDLOW
BY
ATTORNEYS June 12, 1962  T. B. LUDLOW  3,038,982
TAPE HEATER Filed Jan. 23, 1959  2 Sheets-Sheet 2

INVENTOR.
THOMAS B. LUDLOW
BY
ATTORNEYS

United States Patent Office 3,038,982
Patented June 12, 1962

3,038,982
TAPE HEATER
Thomas B. Ludlow, St. Paul, Minn., assignor to Bemis Bro. Bag Company, Minneapolis, Minn., a corporation of Missouri
Filed Jan. 23, 1959, Ser. No. 788,567
13 Claims. (Cl. 219—19)

This invention relates to tape applicating machinery and to a method of preparing heat sensitive tape for application. More particularly this invention relates to machinery and method for heating tape having a thermoplastic adhesive coating on one surface thereof. A principal structural feature of the apparatus of this invention is a form taken by the tape heating element which is that of a ring having heating units mounted directly in it. Means for rotatably supporting a role of tape are secured inside the ring, and the tape is drawn from the roll through an opening in the ring and around over its surface. Between the inside of the ring and the tape there is insulating material which limits without preventing altogether heat from reaching the interior. For this reason, the tape is warmed prior to being presented to the actual heating surface which is the exterior of the ring. The heating surface provided by the circumference of the ring is great enough so that a relatively low temperature can be used even when comparatively high tape speeds are involved.

Heretofore, it was thought to be essential in the application of heat sealing tapes that the tape be heated to relatively high temperature during a brief period immediately before being applied to a substrate. Also, in some cases, it was thought to be essential that the substrate be heated as well as the tape, in order to provide a good joint between the tape and the substrate. These beliefs resulted in a machine which was likely to overheat the tape and, consequently, cause any of a series of difficulties on occasion, such as fires, degrading the paper backing, degrading the adhesive, or causing the adhesive to be absorbed into the tape backing. As a result, it was thought necessary to provide means for automatically removing the heater or otherwise preventing overheating of the tape when the machine operation was interrupted. Furthermore, because of the brief period of heating, the temperature of the tape varied with its speed through the heater, and at very high application speeds the tape often was not softened enough to provide good bond in spite of the high temperature of the heater.

It is the main object of this invention to provide a tape heater that will heat tape adequately for a good seal throughout the range of machine operating speeds.

Another object of this invention is to provide a tape heating structure which will not degrade paper tape left in the machine even during long periods during which the tape applying operation is interrupted. It is also an object of this invention to provide an apparatus for heating and applying heat sealing tape which does not require an automatic device for turning off or removing the heater when the machine operation is interrupted, thereby reducing the cost of the machine, making it more economical and easier to operate.

These and other objects will be apparent from reading the following description and examining the accompanying drawings which form part of the specification.

In the drawing:

FIGURE 1 is a side elevation of one form of this invention; a portion is broken away to illustrate internal structure.

FIGURE 4 is an enlarged isometric view of the applicator block; the scale used is that of FIGURES 2 and 3.

FIGURE 5 is a sectional view on the line 5—5 of FIGURE 4.

Figure 2:
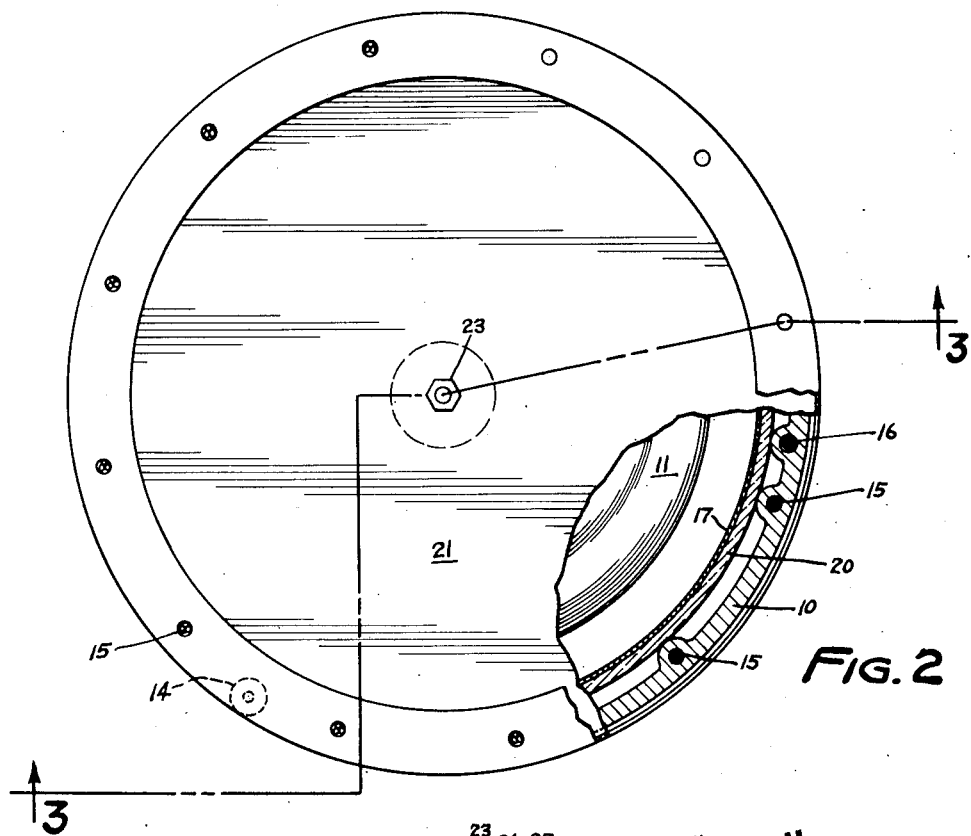
FIGURE 2 is an enlarged side elevation of the tape roll supporting structure from the opposite side to that shown in FIGURE 1; a portion of the device is broken away.
Figure 3:
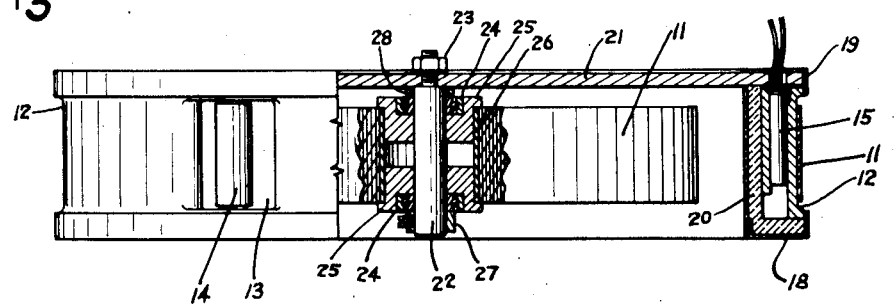
FIGURE 3 is a sectional view taken along line 3—3 and drawn to the same scale as FIGURE 2.

Referring to the drawings there is shown a heater ring 10 adapted to fit around the outside and, approximately, concentric with a roll of heat sealing tape 11. A means for guiding the tape 11 is provided on the outside of the ring 10 such as circumferential channel 12 in which the tape travels around the outside and in contact with the heater ring 10. The channel guides the tape around the ring and prevents it from falling off the side. An opening 13 is provided at one point on the ring through which the tape 11 may pass from its roll to the outside of the ring. Mounted between the side edges of the opening 13 is a roller 14 over which the tape passes when traveling to the outside of the ring. A plurality of electric heating elements 15 are recessed at regular intervals in the ring. Bimetallic thermal switch 16 is similarly recessed in the ring, and controls the temperature of the ring conventionally. Mounted concentrically within the ring 10 and spaced therefrom is an inner retainer ring 17. Extending from each edge of the inner retainer ring 17 outwardly along each side of the heater ring 10 are side retainer rings 18 and 19. Between the retainer ring 17 and the heater ring 10 is packed an insulating material 20 which may be spun glass wadding or the like. Insulation 20 may be thought of as a means for limiting the amount of heat transferred to the space surrounded by ring 10. It has been found adequate to prevent a roll of tape inside the ring 10 from being warmed to the point where blocking occurs. Blocking is a term used in the trade to designate a situation that develops when the tape sticks to itself and fails to unroll. A plate 21 that is secured to the heater ring serves as a support for the shouldered shaft 22. The shaft 22 is held in place by any suitable means such as the nut 23. Spaced from each other on shaft 22 are two suitable bearings 24. Mounted on each bearing are two hollow cylindrical core holders 25. The roll of tape 11 on the usual tape core 26 is rotatably supported on the core holders 25. A collar 27 serves to hold the bearings, core holders, and tape on shaft 22. Spacer ring 28 serves to space one of the bearings 24 from plate 21.

On one side of opening 13 is provided a tape applicator guide adapted to receive the heated tape as it passes away from the surface of heater ring 10. The guide consists of a block 30 attached to the heater ring 10 by suitable means such as cap screws 31, a roller 32 under which the tape passes as it enters the guide, an outer folder blade 33 that turns the tape down over the top edge of a bag 34 to which the tape is to be bonded, an inner blade 35 to position the bag as it passes through the guide, two electrical heating elements 36 that continue heating the tape, and a bimetallic thermal switch 37 that controls the temperature to which heating elements 36 heat the tape 11.

The operation of the device may best be seen in FIGURE 1. When the heater ring 10 has reached the appropriate temperature, tape 11 is placed on the shaft 22, and unwound in such direction that the back or nonadhesive side of the tape lies in channel 12. Tape 11 is drawn out through the opening 13, around roller 14, around the ring 10, within channel 12, and through the applicator guide. A suitable conveyor (not shown) passes sewn bags through the channel formed by the inner blade 35, and the heat sealing tape is folded down over the sides of the bag by means of folder blade 33. One or more pairs of rollers 38 on either side of the tape press it into contact with the sides of the bag top. The tape extending between the adjacent bag ends may be cut by any convenient cut-off mechanism. An appropriate temperature for the heater ring will depend on the adhesive being used, but I have found that the ring held at from 250° to 300° F. will soften adequately to provide a good bond when thermoplastics such as wax, vinyl chloride polymers, rosins, rosin derivatives, thermoplastic cellulosics, ethylene polymers, or compatible mixtures thereof with rubber or other elastomers are used. Furthermore, temperatures on the order of 250° to 300° F. are not so high that the paper of the bags or the backing of the tape will be damaged if operation is interrupted and the tape remains stationary on the heating ring 10. At the same time, this path that the tape takes in the process of being heated on its way to being bonded with the bag top is so great that a temperature of 250° to 300° F. is sufficient to soften the thermoplastics even when the highest bag sealing rates are used.

It is apparent that many modifications and variations of this invention as hereinbefore set forth may be made without departing from the spirit and scope thereof. The specific embodiments described are given by way of example only, and the invention is limited only by the terms of the appended claims.

I claim:

1. An apparatus for heating heat sealing tape comprising; a heating ring adapted to embrace a roll of heat sealing tape, said heating ring including an opening therein through which heat sealing tape may be passed; heating means secured to said heating ring; means secured to said ring for guiding tape circumferentially around the outside of said heating ring; means for limiting the amount of heat applied to said heating ring that is transmitted to the space surrounded by said heating ring; a shaft operatively associated with said heating ring approximately in the center thereof; means on said shaft for rotatably supporting a roll of tape and means to control the temperature of said heating ring secured thereto.

2. The apparatus according to claim 1 in which said means for limiting the amount of heat transmitted to the space surrounded by said heating ring comprises insulating material on the inside surface of said heating ring.

3. The apparatus for heating heat sealing tape according to claim 2 in which a tape shaping and applying structure is associated with said heating ring operatively, and independent heating means secured to said tape shaping and applying structure whereby said tape shaping and applying structure may be held at a predetermined temperature different from the temperatures of said heating ring.

4. An apparatus for heating heat sealing tape according to claim 1 in which a tape shaping and applying structure is associated with said heating ring operatively, and independent heating means secured to said tape shaping and applying structure; whereby said tape shaping and applying structure may be held at a predetermined temperature different from the temperature of said heating ring.

5. In a tape heater; a heating ring having an opening therein through which tape may be passed; said ring adapted to embrace a roll of tape; means secured to said ring for guiding tape around its outside surface; and means operatively associated with said ring to heat tape passing around its outside surface to a predetermined temperature; and means for rotatably supporting a roll of tape inside said ring.

6. The tape heater of claim 5 in which said means operatively associated with said ring to heat tape comprises at least one electrical heater secured to said heating ring.

7. The tape heater of claim 6 in which there are a plurality of electrical heaters spaced from each other around said heating ring.

8. The tape heater of claim 5 in which a roller is rotatably secured to said ring adjacent the opening therein.

9. In a tape heater; a heating ring having an opening therein through which tape may be passed; said ring adapted to embrace a roll of tape; means secured to said ring for guiding tape around its outside surface; a plurality of electrical heating elements secured to said heating ring in spaced relationship to each other; a thermostatic switch secured to said heating ring and controlling said electrical heating elements; a roller rotatably secured to said heating ring adjacent the opening in the ring; a plate secured to said heating ring closing one side thereof; insulation secured inside said heating ring; and an independently heated tape shaping and applying means intimately associated with said heating ring.

10. In a tape heater, an elongated arcuate heating surface, means for heating said elongated heating surface to a temperature of about 300° F.; means for guiding tape over said surface; means for supporting a roll of tape within and adjacent said arcuate surface; and means for limiting the amount of heat transferred from said arcuate surface to said roll of tape.

11. In a method of preparing rolls of thermoplastic tape for use comprising; warming the tape in its storage place; removing the tape from its storage place only as it is to be used; sliding the tape in contact with a heating surface that is longer than the circumference of a roll of tape employed in the method; maintaining heating the surface at a temperature of from 250° F. to 300° F. and continuing to heat the tape as it is being shaped immediately preparatory to applying it.

12. In a method of preparing rolls of thermoplastic tape for use comprising; warming the tape in its storage place; removing the tape from its storage place only as it is to be used; sliding the tape in contact with a heating surface that is longer than the circumference of a roll of tape employed in the method; maintaining the heating surface at a predetermined temperature, and continuing to heat the tape as it is being formed immediately preparatory to applying it.

13. A tape heater comprising: a tape storage housing, means for warming said tape storage housing, a tape heating surface near but external of said tape storage housing; said tape heating surface being heated to a higher temperature than said tape storage housing, said tape storage housing having an opening therein through which tape is withdrawn, means for directing tape withdrawn from said tape storage housing over said heating surface, means for controlling the heat applied to said heating surface and said tape storage housing; shaping and applying structure operatively associated with said storage housing and heating surface, and heating means for said shaping and applying structure secured thereto and independent of the means for warming said tape storage housing and said heating surface.

References Cited in the file of this patent

UNITED STATES PATENTS

| | | |
|---|---|---|
| 976,231 | Sydeman et al. | Nov. 22, 1910 |
| 2,123,415 | Gorbatenko | July 12, 1938 |
| 2,235,704 | Gorbatenko et al. | Mar. 18, 1941 |
| 2,276,297 | Flood | Mar. 17, 1942 |
| 2,378,599 | Thornton | June 19, 1945 |
| 2,401,841 | Singer | June 11, 1946 |
| 2,483,715 | Solon | Oct. 4, 1949 |
| 2,524,946 | Von Hofe | Oct. 10, 1950 |
| 2,861,539 | Bergmark | Nov. 25, 1958 |
| 2,870,312 | Westervelt | Jan. 20, 1959 |
| 2,929,907 | Collins | Mar. 22, 1960 |